(12) United States Patent
Yang et al.

(10) Patent No.: US 11,471,750 B1
(45) Date of Patent: Oct. 18, 2022

(54) LANDING RAMP

(71) Applicant: Yonggang Yang, Beijing (CN)

(72) Inventors: Yonggang Yang, Beijing (CN); Jian Sun, Beijing (CN)

(73) Assignee: Yonggang Yang, Bejing (CN)

( * ) Notice: Subject to any disclaimer, the term of this patent is extended or adjusted under 35 U.S.C. 154(b) by 0 days.

(21) Appl. No.: 17/704,470

(22) Filed: Mar. 25, 2022

(30) Foreign Application Priority Data

Oct. 8, 2021 (CN) .......................... 202111172446.9

(51) Int. Cl.
*A63C 19/10* (2006.01)
*A63B 69/18* (2006.01)
*A63C 19/04* (2006.01)

(52) U.S. Cl.
CPC .............. *A63C 19/10* (2013.01); *A63B 69/18* (2013.01); *A63C 19/04* (2013.01); *A63B 2069/185* (2013.01)

(58) Field of Classification Search
CPC ......... A63C 19/00; A63C 19/04; A63C 19/10; A63B 69/18; A63B 69/10026; B65G 69/30
USPC ..................................... 472/88–91; 482/143
See application file for complete search history.

(56) References Cited

U.S. PATENT DOCUMENTS

| 4,148,477 | A | * | 4/1979 | Larson | ................... | A63B 69/18 472/91 |
| 5,381,668 | A | * | 1/1995 | Morioka | ................. | E01C 13/12 62/235 |
| 2010/0197416 | A1 | * | 8/2010 | Brown | ................... | A63C 19/10 472/90 |
| 2016/0289901 | A1 | * | 10/2016 | Reindl | ................... | D03D 15/58 |
| 2018/0353842 | A1 | * | 12/2018 | Jacobson | .............. | E01C 13/105 |

* cited by examiner

*Primary Examiner* — Kien T Nguyen
(74) *Attorney, Agent, or Firm* — Cooper Legal Group, LLC; William J. Cooper; Marcus Fischer

(57) ABSTRACT

The present application relates to a landing ramp, which includes a ramp body; the ramp body includes an inclined ramp, a granule retaining dam disposed at the lower end of the inclined ramp and protruding from a slope of the inclined ramp, and a deceleration ramp disposed on one side of the granule retaining dam away from the inclined ramp; a dry snow grass sliding blanket is provided on the deceleration ramp, a dry snow granule layer is provided on the inclined ramp and the dry snow grass sliding blanket; the dry snow grass sliding blanket includes a mounting mesh plate and a dry grass body provided on the mounting mesh plate, there are multiply dry grass body spacingly distributed, a dry snow granule is filled between the dry grass bodies, the aperture of the mounting mesh plate is smaller than the diameter of a dry snow granule.

17 Claims, 5 Drawing Sheets

LANDING RAMP

CROSS-REFERENCE TO RELATED APPLICATION

This application claims the priority and benefit of Chinese patent application serial no. 202111172446.9, filed on Oct. 8, 2021. The entirety of Chinese patent application serial no. 202111172446.9 is hereby incorporated by reference herein and made a part of this specification.

TECHNICAL FIELD

The present application relates to a field of sports facilities used in sports such as skiing and kitesurfing that involves a "sport leap", and in particular, relates to a landing ramp.

BACKGROUND ART

Skiing is a very popular sport. However, people can only go skiing in the short and cold winter relying on natural snow or artificial snow. In order to prevent skiing from being restricted by natural seasons, those skilled in the art have developed plastic snow for skiing in four seasons, which is abbreviated as "dry snow". The real snow slideway includes a sliding snow trail and a landing ramp. Correspondingly, the dry snow slideway also includes a dry snow sliding trail and a dry snow landing ramp.

The action of "sports leap" is designed in many sports, especially in skiing and kitesurfing. However, it is very dangerous to finish "sports leap" action in the landing ramp, which may lead to a serious sports injury or even disability.

Therefore, it is particularly important to design a platform landing ramp with high technological content for the leaper, who wants to experience the flying, in which the landing ramp is the key part.

The existing dry snow landing ramp is realized by the technology of "air cushion water spraying". Specifically, the "air cushion water spraying" includes inflating air cushion, mounting the air cushion on the ramp below the takeoff platform, and spraying water evenly on the air cushion for slipping. Although the "air cushion water spraying" technology can ensure the safety of the leaper, the air cushion cannot realize the carving skiing, so that 100% of the leaper end with falling on the ground, which makes it impossible for the sporter to continue to slide after leaping. Another deficiency of the "air cushion water spray" is that this landing technology can only be used in midsummer or severe winter. Since the leaper may completely damped with the sprayed water, the damp leaper cannot resist against the cold in spring and autumn, resulting in a large physical energy consumption of the leaper. Continuous inflation, deflation and uniform water spraying in a large area all need to consume a lot of water and electricity, and it also needs a manual real-time control.

Directing to the above technology, the existing landing ramp is restricted by seasons, has a low safety and cannot satisfy the leaper to finish the complete "sports leap" action, which has a large space to improve.

SUMMARY

In order to solve the problems that the landing ramp is restricted by seasons, has a low safety and cannot satisfy the leaper to finish the complete "sports leap" action, the present application provides a landing ramp.

The landing ramp according to the present application adopts the following technical solution.

In first aspect, the present application provides a landing ramp, including a ramp body; the ramp body comprises an inclined ramp, a granule retaining dam arranged at a lower end of the inclined ramp and protruding from a slope of the inclined ramp, and a deceleration ramp arranged on one side of the granule retaining dam away from the inclined ramp;

a dry snow grass sliding blanket is provided on the deceleration ramp, a dry snow granule layer is laid on the inclined ramp and the dry snow grass sliding blanket;

the dry snow grass sliding blanket comprises a mounting mesh plate and a plurality of dry grass bodies provided on the mounting mesh plate, the plurality of dry grass bodies are arranged at intervals, an aperture of meshes on the mounting mesh plate is smaller than a diameter of a dry snow granule, dry snow granules are filled between the dry grass bodies;

the dry grass body comprises a support column with one end fixed on the mounting mesh plate, and a dry grass end fixed on another end of the support column.

With the above technical solution, the dry snow granule layer laid on the inclined ramp can roll down freely from the upper end of the inclined ramp under the gravity of the dry snow granule, which form a stable and flat landing surface, so as to help the leaper to finish the carving skiing of the landing action without seasonal restriction and under safety of the leaper, further to facilitate the leaper to finish the whole action of "sports leap". After the dry snow grass sliding blanket is laid on the deceleration ramp, it can form a good and stable laying foundation for the dry snow granules. After the leaper slides into the deceleration ramp, the leaper continues to use the action of carving skiing, which is conducive for the leaper to finish the landing actions like deceleration and braking quickly and safely under the limited deceleration distance of the deceleration ramp, so as to replace the real snow ramp for the leaper to finish the leap action.

In some embodiments, the support column is in a helical shape.

With the above technical solution, the helical support column has a significantly increased elasticity, which can not only improve the damping performance, but also reduce the break possibility of the support column under stress when the leaper lands, so as to be more conducive for the leaper to complete landing and sliding, and effectively prolongs the service life of the dry snow grass sliding blanket.

In some embodiments, the support column comprises a first support column and a second support column with a length smaller than the first support column, the first support columns and the second support columns are arranged at intervals in sequence.

With the above technical solution, the first support columns and the second support columns forms a staggered layer structure in height, which can not only improve the damping and buffering performance of the dry snow grass sliding blanket, but also effectively improve the storage space of the dry snow granule inside the dry snow grass sliding blanket, so as to improve the stability of the dry snow granule layer laid on the dry snow grass sliding blanket, further to improve the deceleration and braking performance after the leaper lands.

In some embodiments, a fixed leaking plate is provided between the granule retaining dam and the deceleration ramp such that an upper and a lower surface of the ramp body 1 communicate with each other through the fixed leaking plate, a movable leaking plate is provided on the fixed leaking plate and abuts to the fixed leaking plate, the movable leaking plate is able to slide on the fixed leaking plate, an accommodating tank is provided under the fixed leaking plate;

leaking holes with same aperture and layout are provided on the fixed leaking plate and the movable leaking plate, and an aperture of the leaking holes is larger than a diameter of the dry snow granules.

With the above technical solution, with the repeated landings by the leaper on the inclined ramp, the dry snow granules gradually slide down and accumulate on the fixed leaking plate. The movable leaking plate is moved, so that leaking hole of the movable leaking plate is corresponding to the leaking hole of the fixed leaking plate, the accumulated dry snow granule can fall into the accommodating tank for collection through the leaking holes. After the collection of the dry snow granule, which is conductive for the dry snow granule layer to keeping flat and for the leaper to continuing to leap and land. The movable leaking plate is moved again, so that the leaking hole of the movable leaking plate is not corresponding to the leaking hole of the fixed leaking plate, which ensures that the dry snow granule may not fall into the accommodating tank, so that the leaper can continue to finish the actions like leap and land.

In some embodiments, a drain hole is provided on a bottom of the accommodating tank, and an aperture of the drain hole is smaller than the diameter of the dry snow granules.

With the above technical solution, after collection of the dry snow granule, the dry snow granules in the accommodating tank are flushed and cleaned, which can effectively wash away the dust adhered on the surface of the dry snow granules and the impurities mixed between the dry snow granules, so as to reuse the stored and cleaned dry snow granules, greatly reduce the cost of the sports field and achieve the purpose of cleaning and environmental protection. The cleaned dry snow granule can perform a good performance thereof, which is conductive for the leaper to landing safely.

In some embodiments, a raising pipe for raising the dry snow granules is provided in the accommodating tank, an upper end inlet of the raising pipe is located above an upper end of the inclined ramp, and the raising pipe is provided with a motor.

With the above technical solution, the raising pipe communicates the accommodating tank with the position above the inclined ramp. After turning on the power supply of the motor, the motor drives a spiral shaft to rotate to provide lifting force, and the cleaned dry snow granule temporarily stored in the accommodating tank is transported to the upper end of the inclined ramp, so as to realize the reuse of the dry snow granule. The dry snow granule lifted to the upper end of the inclined ramp rolls down from the upper end of the inclined ramp and refills the dry snow granule layer on the inclined ramp, which keeps a dynamic equilibrium of the dry snow granule layer, so as to provide a stable and a safe landing for the leaper.

In some embodiments, a feeding pipe with one end communicated with the accommodating tank is provided in the accommodating tank, the feeding pipe is provided with a motor;

an end of the feeding pipe away from the accommodating tank is communicated with a storage bin, a discharge pipe is connected to the storage bin, the discharge pipe is provided with a motor, and an outlet end of the discharge pipe is positioned above the upper end of the inclined ramp.

With the above technical solution, in winter, when it is convenient for snow making, the dry snow granule can be stored, and the real snow can be paved on the inclined ramp, so as to complete the switching between two modules of dry snow landing ramp and the real snow landing ramp.

In some embodiments, a protection cloth for stopping the dry snow granule is provided on each side of the ramp body.

With the above technical solution, during the repeated landing of the leaper, the protection cloth can effectively prevent the dry snow granule from flowing laterally, which reduces the loss and waste of dry snow granule, and significantly reduces the cost of the landing ramp.

In some embodiments, the ramp body is an antirust ramp body.

With the above technical solution, the ramp body made of the stainless steel has a high corrosion resistance and a relatively high structural strength. When cleaning the dry snow granule, the cleaning water may not corrode the stainless-steel ramp body, which can effectively prolong the service life of the landing ramp, and can ensure the using stability of the landing ramp and the safety of the leaper during exercise.

In some embodiments, the dry snow granule is made of thermoplastic material.

With the above technical solution, the thermoplastic material has a good outdoor durability, and are resistant to sunlight, frost, rain and snow, which can be used outdoors for a long time. In addition, the thermoplastic material is harmless to the human body and is environment friendly, which is conducive for the leaper to finish the leap action.

In second aspect, the present application provides a landing ramp, including a ramp body; the ramp body comprises an inclined ramp, a granule retaining dam arranged at a lower end of the inclined ramp and protruding from a slope of the inclined ramp, and a deceleration ramp arranged on one side of the granule retaining dam away from the inclined ramp; a dry snow grass sliding blanket is provided on the deceleration ramp, a dry snow granule layer is laid on the inclined ramp and the dry snow grass sliding blanket.

In conclusion, the present application includes at least one of the following beneficial technical effect.

1. By providing the ramp body, the dry snow grass sliding blanket and the dry snow granule layer, the dry snow granule layer laid on the inclined ramp can roll down freely from the upper end of the inclined ramp under the gravity of the dry snow granule, which form a stable and flat landing surface, so as to help the leaper to finish the carving skiing of the landing action without seasonal restriction and under safety of the leaper, further to facilitate the leaper to finish the whole action of "sports leap".

2. By providing the helical support column, it has a significantly increased elasticity, which can not only improve the damping performance, but also reduce the possibility of the support column break under stress when the leaper lands, so as to be more conducive for the leaper to complete landing and sliding, and effectively prolongs the service life of the dry snow grass sliding blanket.

3. By providing the first support column and the second support column, it can not only improve the damping and buffering performance of the dry snow grass sliding blanket, but also effectively improve the storage space of the dry snow granule inside the dry snow grass sliding blanket, so as to improve the stability of the dry snow granule layer laid on the dry snow grass sliding blanket, further to improve the deceleration and braking performance after the leaper lands.

BRIEF DESCRIPTION OF THE DRAWINGS

FIG. 3 is a side view diagram of a dry snow grass sliding blanket according to the present application.

DETAILED DESCRIPTION

The present application is further described in detail below with references to FIGS. 1-6.

Figure 1:
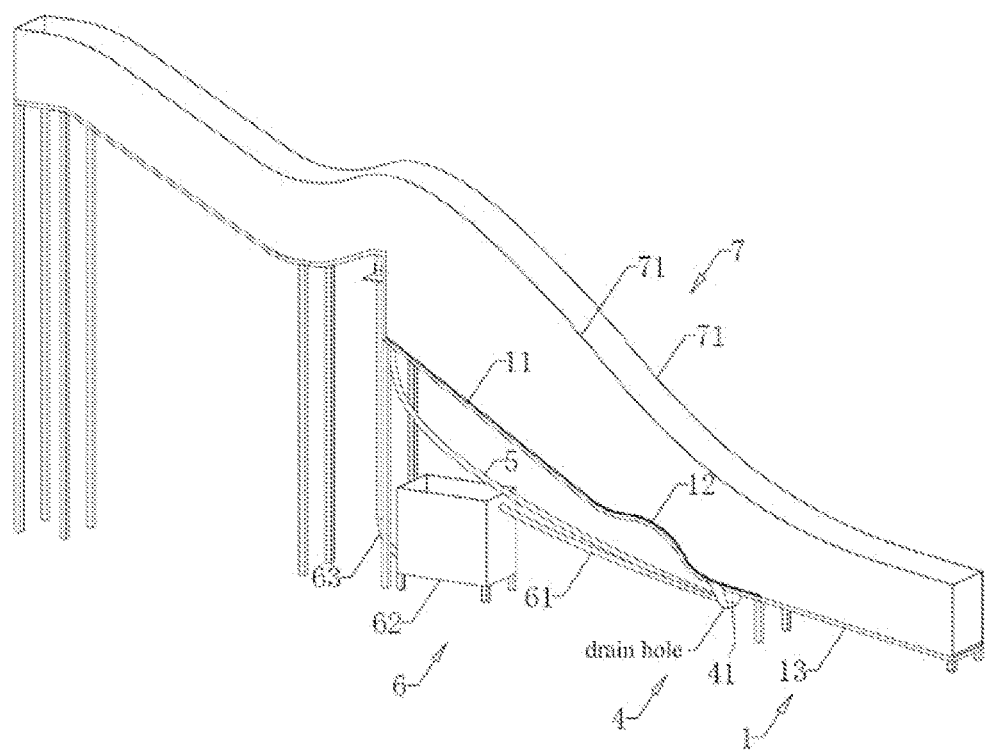
FIG. 1 is a schematic structural diagram of a landing ramp according to the present application.
Figure 2:
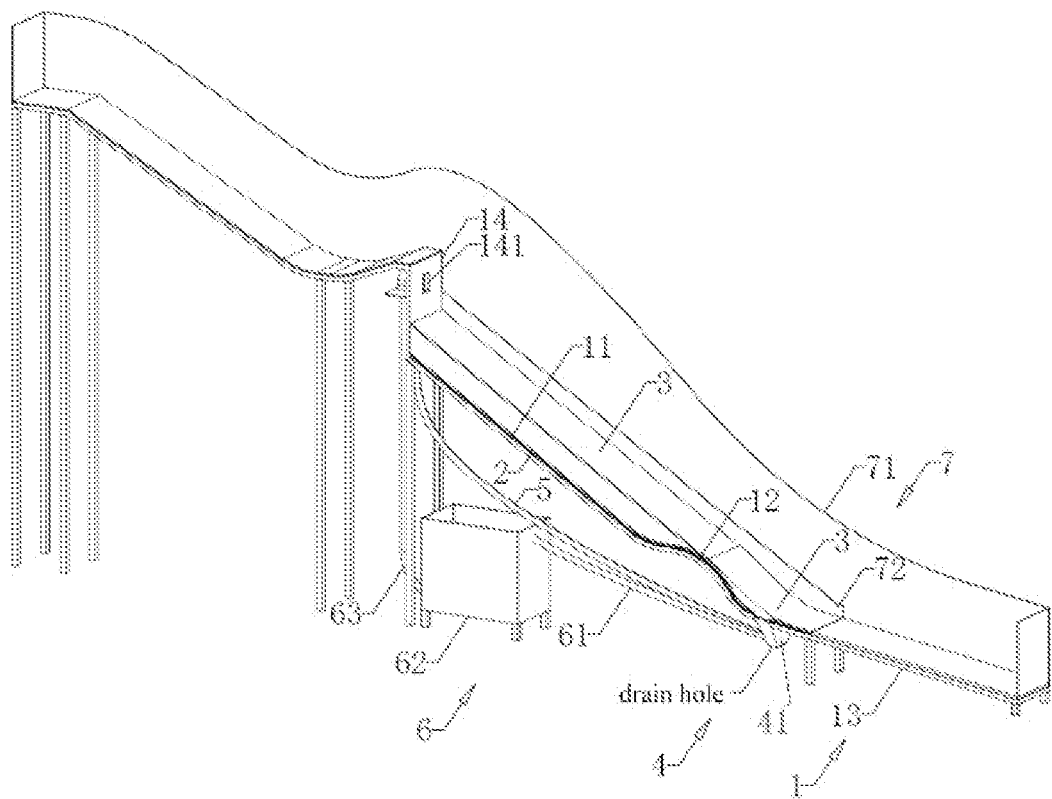
FIG. 2 is a schematic structural diagram of a landing ramp with removing of a protection net on one side according to the present application.

Referring to FIGS. 1 and 2, a landing ramp according to the present application includes a ramp body 1, a dry snow grass sliding blanket 2 laid on the ramp body 1, a dry snow granule layer 3 laid on the ramp body 1 and the dry snow grass sliding blanket 2, an accommodating assembly 4 for accommodating dry snow granules that is arranged at a lower portion of the ramp, a raising pipe 5 communicating the accommodating assembly 4 with the upper portion of the ramp body 1, a storage assembly 6 communicating with the accommodating assembly 4, and a protection device 7 arranged on two sides of the ramp body 1. The dry snow granule layer 3 forms a slope of the landing ramp for a safe landing of the leaper.

Referring to FIG. 1, the ramp body has a stereoscopic frame structure that is disposed obliquely from one end of the upper portion to the other end of the ramp body 1. A mesh plate is laid on the inclined upper portion of the stereoscopic frame structure. The mesh aperture on the mesh plate is smaller than the diameter of the dry snow granule, so that the dry snow granule layer can be laid on the ramp body 1, which also facilitates laying the dry snow grass sliding blanket 2 on the mesh plate. The ramp body is made of stainless steel, or is coated with an antirust material on the surface thereof, so that the ramp body 1 has an anti-rust performance, which is not easy to be corroded by moisture. It can not only keep the structure of the ramp body 1 stable, but also facilitate building of the landing ramp.

Referring to FIGS. 1 and 2, the ramp body 1 includes an inclined ramp 11, a granule retaining dam 12 that is disposed at the lower portion of the inclined ramp 11 and protrudes from a slope of the inclined ramp 11, and a deceleration ramp 13 that is disposed on one side of the granule retaining dam 12 away from the inclined ramp 11. The deceleration ramp 13 is disposed obliquely from a side close to the granule retaining dam 12 to a side away from the granule retaining dam 12. In this way, the granules crashed down in the landing of the leaper is prevent from accumulating at the junction of the granule retaining dam and the deceleration ramp 13, which may not hinder the leaper from landing, decelerating and braking.

In this embodiment, an included angle of the slope surface of inclined ramp 11 is 30°. An included angle between a para-curve during the leaping of the leaper and the slope of the inclined ramp 11 is less than 35°. The thickness of the dry snow granule layer 3 is 30 cm, and the bulk density thereof is 0.6 g/cm$^3$. In the landing of the leaper, the first buffer distance is 90 cm, and the second buffer distance is 15 m. When leaping over a landing ramp with ultra-difficulty, with a thickness of the dry snow granule layer 3 greater than or equal to 50 cm and a bulk density of 0.4 g/cm3, the first buffer distance of the leaper is 1.5 m. The dry snow granule layer with sufficient thickness, the sufficient first buffer distance and the sufficient second buffer distance can provide a complete sliding guarantee for leaper, which protects the slider safety comprehensively.

Referring to FIG. 2, the length of the granule retaining dam is consistent with the width of the inclined ramp 11. Two end portions of the granule retaining dam 12 in the length direction respectively connect to the inclined ramp 11 and the deceleration ramp 13 in an arc shape. The top portion of the granule retaining dam 12 is also in an arc shape. The arc connection can not only stop the dry snow granules so that the dry snow granule layer is laid on the inclined ramp stably, but also do not interfere with a smooth landing of the leaper so that there is no jamming when the leaper slides over the granule retaining dam 12, which facilitates the leaper to finish the landing action. With laying of the dry snow granule layer 3 on the inclined ramp 11, the dry snow granules roll down freely towards the lower end of the inclined ramp 11 under the gravity thereof, the dry snow granules rolled down onto the granule retaining dam 12 are stopped by the granule retaining dam 12, so that the dry snow granule layer 3 forms a stable and flat landing surface on the inclined ramp 11.

The dry snow granules are made of thermoplastic material such as PP or TPE material. The thermoplastic material has a good outdoor durability and a good corrosion resistance, which can be used outdoors for a long time. In addition, it facilitates washing the dry snow granule by water, which can keep the dry snow granule clean.

The dry snow granule is in a cylindrical shape. The end surface diameter of the dry snow granule is 2.5 mm, and the height of the dry snow granule is 3 mm. When the leaper contacts with the dry snow granules, the dry snow granule with the above dimension can effectively reduce the possibility of the dry snow granule entering into the ear, eye, nose or respiratory tract of the leaper. When accumulating and filling in the dry snow granule, since the dry snow granules are loose, the dry snow granules can roll down freely to form a flat slope without manual stacking, which saves time and labor, and effectively improves the work efficiency of staff.

The thickness of the dry snow granule layer 3 is the same as the vertical height of the granule retaining dam 12. In this embodiment, the thickness of the dry snow granule layer 3 is 15 cm to 150 cm, and the bulk density is 0.4 g/cm$^3$ to 0.6 g/cm$^3$. The greater the difficulty coefficient of a leaping action, the thicker the thickness of the dry snow granule layer 3. In this way, parameters of the landing ramp can be changed according to the actual requirement to improve the applicability of the landing ramp.

Referring to FIGS. 2 and 3, the dry snow grass sliding blanket 2 is laid on a stainless-steel mesh plate of the deceleration ramp 13. The dry snow grass sliding blanket 2 includes a mounting mesh plate 21, a support column 221 with one end integrally formed with the mounting mesh plate 21, and a dry grass end 222 integrally formed on one end of the support column 221 away from the mounting mesh plate 21. There are a plurality of support columns 221 arranged at intervals, which can provide a sufficient deformation space after the support columns are stressed. After the dry snow granules are laid on the dry snow grass sliding blanket 2, the dry snow granules can also be filled between the support columns, so that the dry snow granules can be stably positioned on the dry snow grass sliding blanket 2. The dry grass end 222 is in a globular shape, which can not only provide braking resistance for the leaper, but also facilitate the smooth sliding of the leaper on the deceleration ramp 13.

Referring to FIG. 3, the support column is in a 360° helical shape, so as to increase the elasticity of the support column 221 significantly. When a large stress is applied to the support column 221 during the landing of the leaper, the break possibility of the support column 221 under stress is significantly decreased. In addition, the damping performance of the landing ramp is also improved, which is conductive for the leaper to land safely.

The support column 221 includes a first support column 2211 and a second support column 2212. The length of the second support column 2212 is smaller than the length of the first support column 2211. The first support columns 2211 and the second support columns 2212 are alternatively arranged at intervals in sequence. For example, one first support column 2221 is positioned between four second support columns 2212, and one second support column 2212 is positioned between four first support columns 2211. Since the first support columns 2211 and the second support columns 2212 are alternatively arranged at intervals, a storage space with height difference is formed, so as to improve the stability of the dry snow granule laid on the dry snow grass sliding blanket.

Figure 4:
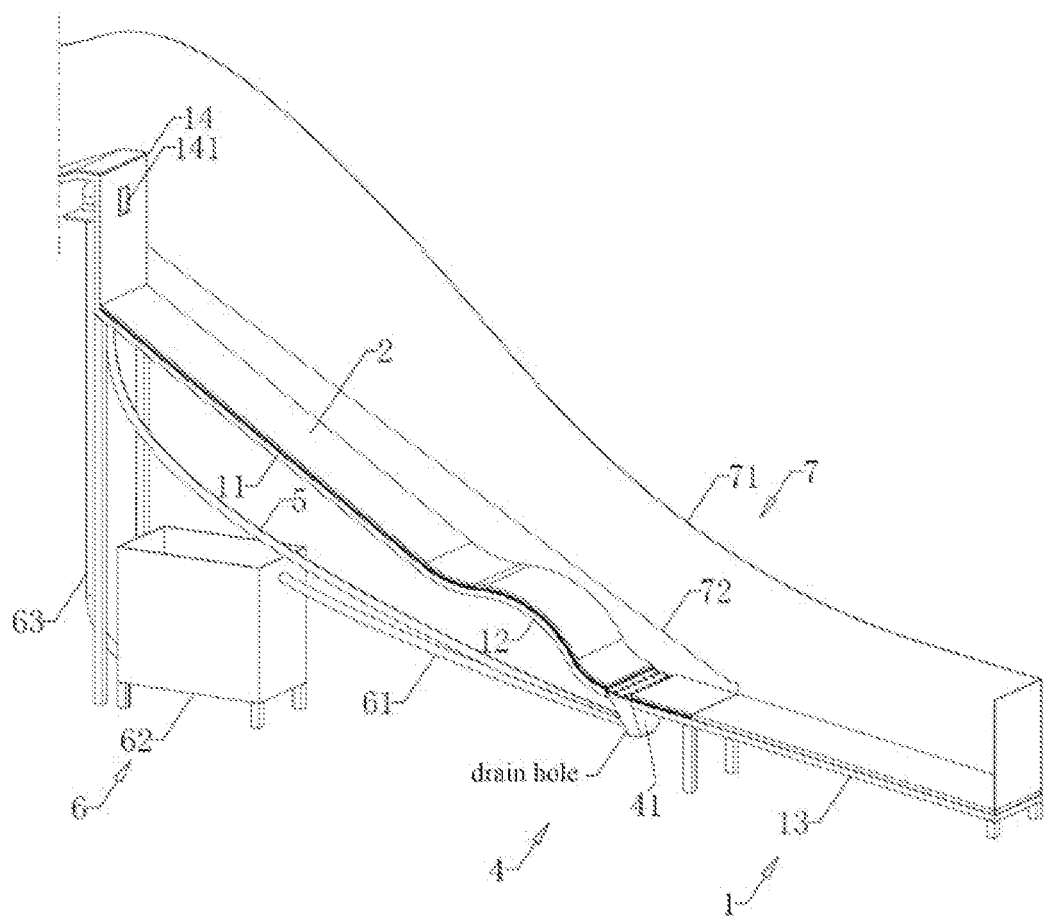
FIG. 4 is a schematic structural diagram of a ramp body according to the present application.
Figure 5:
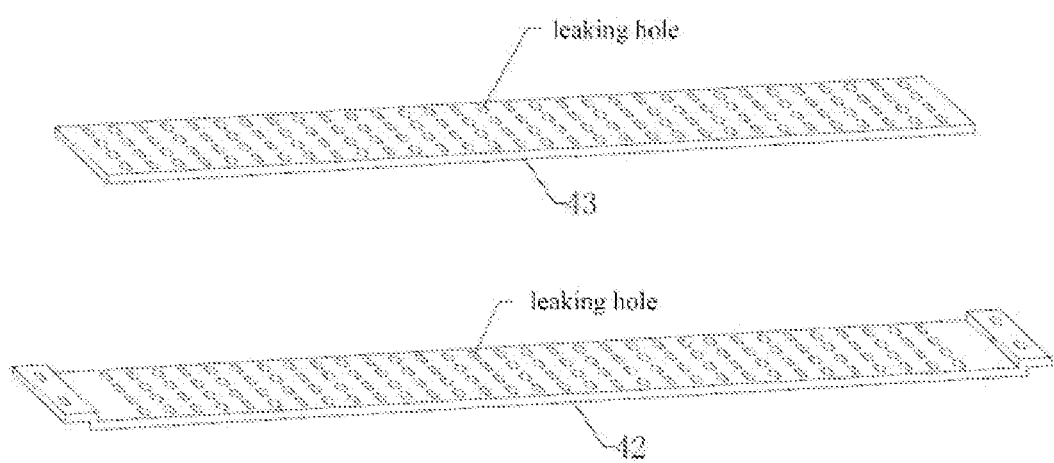
FIG. 5 is a schematic structural diagram of a fixed leaking plate and a movable leaking plate according to the present application.

Referring to FIGS. 4 and 5, the accommodating assembly 4 includes an accommodating tank 41 arranged under the ramp body 1, a fixed leaking plate 42 mounted at the junction of the granule retaining dam 12 and the deceleration ramp 13, and a movable leaking plate 43 slidably arranged on the fixed leaking plate 42. The accommodating tank 41, the fixed leaking plate 42, and the movable leaking plate 43 are all made of stainless steel. The accommodating tank 41 is in a funnel shape and the larger opening of the accommodating tank 41 faces towards the ramp body 1. Drain holes are provided on the bottom of the accommodating tank 41, and the aperture of the drain holes is smaller than the diameter of the dry snow granules, so that the dry snow granules can be stored in the accommodating tank 41 and the cleaning water can be drained through the drain holes when washing the dry snow granules. The dry snow granule may not be soaked in the cleaning water for a long time, which reduces the soaking possibility of dry snow granule, and effectively prolong the service life of dry snow granule.

Referring to FIG. 5, the length direction of the fixed leaking plate 42 is perpendicular to the length direction of the ramp body 1. Two ends of the fixed leaking plate 42 are bent twice respectively to form two lapping ends. Two lapping ends are easy to be prefabricated on the frame structure of the ramp body 1, and the fixed leaking plate 42 can be stably mounted on the ramp body 1 with connectors such as bolts.

A sliding groove for placing the movable leaking plate 43 is formed between two lapping ends of the fixed leaking plate 42. The length of the movable leaking plate 43 is smaller than the length of the sliding groove.

Referring to FIG. 5, the fixed leaking plate 42 and the movable leaking plate 43 are formed with leaking holes with same aperture and layout. The leaking holes of the fixed leaking plate 42 and the leaking hole of the movable leaking plate 43 can be fully communicated with each other, or be staggered with each other and closed. The dry snow granules can fall into the accommodating tank 41 through the leaking holes. When the leaper lands on the landing ramp, the leaking holes of the fixed leaking plate 42 and the leaking holes of the movable leaking plate 43 are staggered, such that the dry snow granules cannot fall into the accommodating tank 41. When collecting the dry snow granules, the leaking holes of the movable leaking plate 43 are aligned with the leaking holes of the fixed leaking plate 42, so that the upper and lower surface of the ramp body 1 communicate with each other through the leaking holes, which facilitates the dry snow granule falling into the accommodating tank 41.

Referring to FIG. 4, a connecting plate 14 is vertically arranged on the upper end of the inclined ramp 11. The lower edge of the connecting plate 14 is connected to the inclined ramp 11, and the upper edge of the connecting plate 14 is connected to the lower end of an acceleration ramp of a slide way. An outlet 141 for spraying dry snow granules is provided on the connecting plate 14.

Referring to FIG. 4, the lower end of the raising pipe 5 is connected to the lower portion of a sidewall of the accommodating tank 41, and the upper end of the raising pipe 5 is communicated with the outlet 141. The raising pipe 5 adopts a spiral pipe. The raising pipe is provided with a motor. When the motor is in operation, the dry snow granules in the accommodating tank 41 can be transported to the upper end of the inclined ramp 11 through the raising pipe 5, so as to reuse the dry snow granules.

Figure 6:
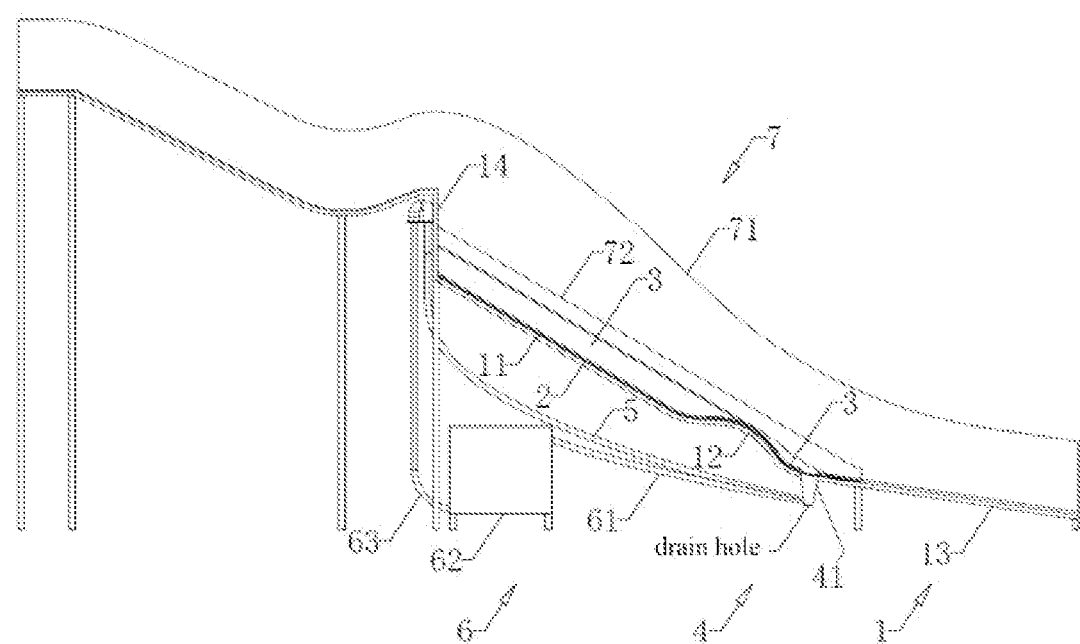
FIG. 6 is side view diagram of a landing ramp with removing of a protection net on one side according to the present application.

Referring to FIGS. 4 and 6, the storage assembly 6 includes a feeding pipe 61 with one end communicated with the lower portion of the sidewall of the accommodating tank 41, a storage bin 62 disposed under the ramp body 1 and connected to an end of the feeding pipe 61 away from the accommodating tank 41, and a discharge pipe 63 with a lower end communicated with the lower portion of a sidewall of the storage bin 62. The upper end of the discharge pipe 63 is communicated with the outlet 141. The end of the feeding pipe 61 away from the accommodating tank 41 is positioned at the upper position of the sidewall of the storage bin 62.

The feeding pipe 61 and the discharge pipe 63 both adopt spiral pipes. The feeding pipe 61 and the discharge pipe 63 are each provided with a motor, so that the dry snow granules in the accommodating tank 41 can be sucked into the storage bin 62, and the dry snow granules in the storage bin 62 can be sucked to the outlet 141. In this way, the dry snow granules are sprayed to the upper end of the inclined ramp 11 through the outlet 141.

Referring to FIG. 6, the protection device 7 includes a frame (not shown in the figures) arranged along the length direction of the ramp body 1, a protection net 71 fixed on a side of the frame facing the ramp body 1, and a protection cloth 72 fixed on a side of the protection net 71 facing the ramp body 1. The height of the protection cloth 72 is 0.5 m to 1 m. The height of the protection net 71 is larger than the height of the protection cloth 72. The protection net 71 and the protection cloth 72 are fixed between the lower ends of two frames, so as to stop the dry snow granule comprehensively. The lower edges of the protection net 71 and the protection cloth 72 abut to the slope of the ramp body 1, which effectively reduces the possibility of dry snow granule being pushed out of the ramp body 1 by the leaper, and reduces the waste of the dry snow granule, so as to reduce the production cost of the landing ramp.

In this embodiment, the frame adopts a scaffold supporting. The scaffold has the characteristics of simple structure, stability, easy establishment, and convenient mounting of the protection net 71, which facilitates building the landing ramp.

The above are the preferred embodiments of the present application, which are not intend to limit the protection scope of the present application. Therefore, all equivalent changes made according to the structure, shape and principle of the present application should be covered within the protection scope of the present application.

What is claimed is:

1. A landing ramp, comprising: a ramp body, wherein the ramp body comprises an inclined ramp, a granule retaining dam arranged at a lower end of the inclined ramp and protruding from a slope of the inclined ramp, and a deceleration ramp arranged on one side of the granule retaining dam away from the inclined ramp;
   a dry snow grass sliding blanket is provided on the deceleration ramp, a dry snow granule layer is disposed on the inclined ramp and the dry snow grass sliding blanket;
   the dry snow grass sliding blanket comprises a mounting mesh plate and a plurality of dry grass bodies provided on the mounting mesh plate, the plurality of dry grass bodies are arranged at intervals, an aperture of meshes on the mounting mesh plate is smaller than a diameter of dry snow granules, the dry snow granules are filled between the plurality of dry grass bodies;
   each of the plurality of dry grass body comprises a support column with one end fixed on the mounting mesh plate, and a dry grass end fixed on another end of the support column.

2. The landing ramp according to claim 1, wherein the support column is in a helical shape.

3. The landing ramp according to claim 2, wherein the support column comprises a first support column and a second support column with a length smaller than the first support column, the first support column and the second support column are arranged at intervals in sequence.

4. The landing ramp according to claim 3, wherein a fixed leaking plate is provided between the granule retaining dam and the deceleration ramp such that an upper surface and a lower surface of the ramp body communicate with each other through the fixed leaking plate, a movable leaking plate is provided on the fixed leaking plate and abuts the fixed leaking plate, the movable leaking plate is configured to slide on the fixed leaking plate, an accommodating tank is provided under the fixed leaking plate;
   leaking holes with a same aperture and a same layout are provided on the fixed leaking plate and the movable leaking plate, and the aperture of the leaking holes is larger than the diameter of the dry snow granules.

5. The landing ramp according to claim 4, wherein a drain hole is provided on a bottom of the accommodating tank, and an aperture of the drain hole is smaller than the diameter of the dry snow granules.

6. The landing ramp according to claim 4, wherein a raising pipe for raising the dry snow granules is provided in the accommodating tank, an upper end inlet of the raising pipe is located above an upper end of the inclined ramp, and the raising pipe is provided with a motor.

7. The landing ramp according to claim 4, wherein a feeding pipe with one end in communication with the accommodating tank is provided in the accommodating tank, the feeding pipe is provided with a motor;
   an end of the feeding pipe away from the accommodating tank is in communication with a storage bin, a discharge pipe is connected to the storage bin, the discharge pipe is provided with a second motor, and an outlet end of the discharge pipe is positioned above an upper end of the inclined ramp.

8. The landing ramp according to claim 7, wherein a protection cloth for stopping the dry snow granules is provided on each side of the ramp body.

9. The landing ramp according to claim 1, wherein a fixed leaking plate is provided between the granule retaining dam and the deceleration ramp such that an upper surface and a lower surface of the ramp body communicate with each other through the fixed leaking plate, a movable leaking plate is provided on the fixed leaking plate and abuts the fixed leaking plate, the movable leaking plate is configured to slide on the fixed leaking plate, an accommodating tank is provided under the fixed leaking plate;
   leaking holes with a same aperture and a same layout are provided on the fixed leaking plate and the movable leaking plate, and the aperture of the leaking holes is larger than the diameter of the dry snow granules.

10. The landing ramp according to claim 9, wherein a drain hole is provided on a bottom of the accommodating tank, and an aperture of the drain hole is smaller than the diameter of the dry snow granules.

11. The landing ramp according to claim 9, wherein a raising pipe for raising the dry snow granules is provided in the accommodating tank, an upper end inlet of the raising pipe is located above an upper end of the inclined ramp, and the raising pipe is provided with a motor.

12. The landing ramp according to claim 9, wherein a feeding pipe with one end in communication with the accommodating tank is provided in the accommodating tank, the feeding pipe is provided with a motor;
   an end of the feeding pipe away from the accommodating tank is in communication with a storage bin, a discharge pipe is connected to the storage bin, the discharge pipe is provided with a second motor, and an outlet end of the discharge pipe is positioned above an upper end of the inclined ramp.

13. The landing ramp according to claim 12, wherein a protection cloth for stopping the dry snow granules is provided on each side of the ramp body.

14. The landing ramp according to claim 1, wherein a protection cloth for stopping the dry snow granules is provided on each side of the ramp body.

15. The landing ramp according to claim 14, wherein the ramp body is an antirust ramp body.

16. The landing ramp according to claim 14, wherein the dry snow granules are made of thermoplastic material.

17. A landing ramp, comprising: a ramp body, wherein the ramp body comprises an inclined ramp, a granule retaining dam arranged at a lower end of the inclined ramp and protruding from a slope of the inclined ramp, and a deceleration ramp arranged on one side of the granule retaining dam away from the inclined ramp; a dry snow grass sliding blanket is provided on the deceleration ramp, a dry snow granule layer is disposed on the inclined ramp and the dry snow grass sliding blanket.

* * * * *